United States Patent
Kamath et al.

(10) Patent No.: US 10,137,486 B1
(45) Date of Patent: Nov. 27, 2018

(54) SYSTEMS AND METHODS FOR THERMAL TREATMENT OF CONTAMINATED MATERIAL

(71) Applicant: Chevron U.S.A. Inc., San Ramon, CA (US)

(72) Inventors: Roopa Kamath, Katy, TX (US); Schaun Malcolm Smith, Lindale, TX (US); Deyuan Kong, San Ramon, CA (US); Gunther H. Dieckmann, Walnut Creek, CA (US); Cesar Ovalles, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/906,175

(22) Filed: Feb. 27, 2018

(51) Int. Cl.
| | |
|---|---|
| *B09C 1/00* | (2006.01) |
| *B09C 1/02* | (2006.01) |
| *B09C 1/06* | (2006.01) |
| *B09C 1/08* | (2006.01) |
| *B09C 1/10* | (2006.01) |

(52) U.S. Cl.
CPC .................................. *B09C 1/065* (2013.01)

(58) Field of Classification Search
CPC ........... B09C 1/00; B09C 1/002; B09C 1/005; B09C 1/02; B09C 1/06; B09C 1/062; B09C 1/065; B09C 1/067; B09C 1/08; B09C 1/085; B09C 1/10; B09C 1/105; B09C 2101/00
USPC ............. 405/128.1–128.9, 131, 258; 166/60, 166/65.1, 248; 299/5, 6, 14; 219/10.81,
(Continued)

(56) References Cited

U.S. PATENT DOCUMENTS

| | | | | |
|---|---|---|---|---|
| 3,586,624 A | * | 6/1971 | Larson ..................... | B09B 1/00 210/747.7 |
| 3,601,448 A | * | 8/1971 | Stone ..................... | E01C 23/12 219/679 |

(Continued)

FOREIGN PATENT DOCUMENTS

| | | |
|---|---|---|
| CN | 202270704 | 6/2012 |
| CN | 102764755 | 11/2012 |

(Continued)

OTHER PUBLICATIONS

Barba, A.A., et al.; "Use of Microwaves for In Situ Removal of Pollutant Compounds from Solid Matrices"; Journal of Hazardous Materials, (2012), vols. 207-208, pp. 128-135.

(Continued)

*Primary Examiner* — Benjamin F Fiorello
*Assistant Examiner* — Edwin J Toledo-Duran
(74) *Attorney, Agent, or Firm* — Karen R. DiDomenicis

(57) ABSTRACT

Contaminant-containing soil can be remediated by subjecting the soil to microwave irradiation to heat the soil to a combustion temperature of from 150° C. to 1200° C. to initiate combustion. A target amount of the contaminant in the soil is destroyed. An oxidizer gas can be flowed through the soil using a gas blower and at least one gas injection line and controlled at a rate such that a self-sustaining smoldering combustion front is formed that moves through the soil. A microwave absorber additive can be added to the soil to accelerate the heating of the soil. At least one waveguide connected to a source of microwave energy directs microwaves into the soil.

25 Claims, 4 Drawing Sheets

(58) Field of Classification Search
USPC ..... 219/10.57, 10.41, 10.43, 1.55 A, 1.55 R, 219/1.55 M
See application file for complete search history.

(56) References Cited

U.S. PATENT DOCUMENTS

| | | | | |
|---|---|---|---|---|
| 3,866,255 A * | 2/1975 | Serota | ............... | D06C 7/00 219/773 |
| 4,140,179 A * | 2/1979 | Kasevich | ............... | E21B 36/04 166/248 |
| RE30,738 E * | 9/1981 | Bridges | ............... | E21B 36/04 166/245 |
| 4,296,298 A * | 10/1981 | MacMaster | ............... | H05B 6/62 219/771 |
| 4,323,367 A * | 4/1982 | Ghosh | ............... | B09B 1/00 210/603 |
| 4,376,033 A * | 3/1983 | Calderon | ............... | C10B 19/00 208/402 |
| 4,376,598 A * | 3/1983 | Brouns | ............... | B09B 1/00 175/16 |
| 4,396,402 A * | 8/1983 | Ghosh | ............... | B09B 1/00 210/603 |
| 4,401,569 A * | 8/1983 | Jhaveri | ............... | B09C 1/10 166/246 |
| 4,469,176 A * | 9/1984 | Zison | ............... | B09B 1/006 166/369 |
| 4,545,435 A * | 10/1985 | Bridges | ............... | E21B 36/04 166/245 |
| 4,590,348 A * | 5/1986 | Lahti | ............... | E02D 3/11 219/691 |
| 4,670,634 A * | 6/1987 | Bridges | ............... | B09C 1/005 166/248 |
| 4,793,656 A * | 12/1988 | Siddoway | ............... | E21B 43/243 166/260 |
| 4,834,194 A * | 5/1989 | Manchak, Jr. | ............... | B09C 1/06 166/250.01 |
| 4,900,196 A * | 2/1990 | Bridges | ............... | B09B 1/00 166/248 |
| 4,956,535 A * | 9/1990 | Buelt | ............... | B09C 1/067 166/248 |
| 4,957,393 A * | 9/1990 | Buelt | ............... | B09C 1/065 405/128.6 |
| 4,973,811 A * | 11/1990 | Bass | ............... | B09C 1/062 166/248 |
| 4,984,594 A * | 1/1991 | Vinegar | ............... | B09C 1/06 134/1 |
| 5,004,373 A * | 4/1991 | Carter | ............... | B09C 1/067 299/14 |
| 5,011,329 A * | 4/1991 | Nelson | ............... | B09C 1/06 405/128.65 |
| 5,065,819 A * | 11/1991 | Kasevich | ............... | E21B 36/04 166/248 |
| 5,152,341 A * | 10/1992 | Kasevich | ............... | B09C 1/062 166/248 |
| 5,169,263 A * | 12/1992 | Johnson | ............... | B09C 1/06 405/128.4 |
| 5,190,405 A * | 3/1993 | Vinegar | ............... | B09C 1/005 405/128.4 |
| 5,193,934 A * | 3/1993 | Johnson | ............... | B09C 1/065 405/128.35 |
| 5,209,604 A * | 5/1993 | Chou | ............... | B09C 1/06 405/128.4 |
| 5,244,310 A * | 9/1993 | Johnson | ............... | B09C 1/062 405/128.4 |
| 5,251,700 A * | 10/1993 | Nelson | ............... | B09C 1/06 166/305.1 |
| 5,271,693 A * | 12/1993 | Johnson | ............... | B09C 1/06 405/128.4 |
| 5,293,936 A * | 3/1994 | Bridges | ............... | E21B 36/04 166/248 |
| 5,300,749 A * | 4/1994 | Kotikangas | ............... | D21F 5/165 219/773 |
| 5,325,795 A * | 7/1994 | Nelson | ............... | B09C 1/06 110/204 |
| 5,347,070 A * | 9/1994 | Heath | ............... | B09C 1/06 405/128.6 |
| 5,387,734 A * | 2/1995 | Hagenmaier | ............... | A62D 3/40 423/245.2 |
| 5,420,402 A * | 5/1995 | Bridges | ............... | B09C 1/062 166/248 |
| 5,449,889 A * | 9/1995 | Samardzija | ............... | A01M 1/06 166/248 |
| 5,476,634 A * | 12/1995 | Bridges | ............... | A61L 2/04 250/455.11 |
| 5,482,402 A * | 1/1996 | Nelson | ............... | B09C 1/06 405/128.65 |
| 5,484,985 A * | 1/1996 | Edelstein | ............... | B09C 1/06 166/248 |
| 5,487,873 A * | 1/1996 | Bridges | ............... | A61L 2/08 219/679 |
| 5,508,004 A * | 4/1996 | Held | ............... | A61L 2/04 241/24.1 |
| 5,540,846 A * | 7/1996 | Koch | ............... | B01D 33/21 134/31 |
| 5,545,804 A * | 8/1996 | Archambeault | ............... | B09C 1/06 166/248 |
| 5,556,447 A * | 9/1996 | Srinivasachar | ............... | B09C 1/06 588/256 |
| 5,586,213 A * | 12/1996 | Bridges | ............... | B09C 1/062 166/248 |
| 5,641,423 A * | 6/1997 | Bridges | ............... | H05B 6/60 219/651 |
| 5,656,239 A * | 8/1997 | Stegemeier | ............... | B09C 1/005 422/22 |
| 5,660,500 A * | 8/1997 | Marsden, Jr. | ............... | B09C 1/00 405/128.4 |
| 5,664,911 A * | 9/1997 | Bridges | ............... | B09C 1/00 405/128.4 |
| 5,698,762 A | 12/1997 | Dauerman | | |
| 5,769,569 A * | 6/1998 | Hosseini | ............... | B09C 1/062 166/370 |
| 5,829,519 A * | 11/1998 | Uthe | ............... | B09C 1/06 166/60 |
| 5,829,528 A * | 11/1998 | Uthe | ............... | E21B 35/00 166/305.1 |
| 5,835,866 A * | 11/1998 | Bridges | ............... | G21F 9/30 588/19 |
| 5,931,600 A * | 8/1999 | Sheldon | ............... | B09C 1/06 405/128.6 |
| 5,994,670 A * | 11/1999 | Buettner | ............... | B09C 1/062 219/213 |
| 6,169,278 B1 * | 1/2001 | Sternowski | ............... | B09C 1/062 219/770 |
| 6,248,985 B1 * | 6/2001 | Tomasello | ............... | A61L 11/00 219/679 |
| 6,296,815 B1 * | 10/2001 | Walker | ............... | B09C 1/06 110/236 |
| 6,440,312 B1 * | 8/2002 | Kasevich | ............... | E21B 21/066 175/207 |
| 6,600,142 B2 * | 7/2003 | Ryan | ............... | C09D 167/00 219/634 |
| 6,649,888 B2 * | 11/2003 | Ryan | ............... | C09D 167/00 219/634 |
| 6,658,757 B2 * | 12/2003 | Fout | ............... | B09B 3/00 110/229 |
| 6,951,436 B2 * | 10/2005 | Stegemeier | ............... | B09C 1/06 405/128.4 |
| 7,004,678 B2 * | 2/2006 | Stegemeier | ............... | B09C 1/00 405/128.35 |
| 7,119,689 B2 * | 10/2006 | Mallett | ............... | G06F 19/00 340/572.1 |
| 7,275,645 B2 * | 10/2007 | Mallett | ............... | B07C 7/005 209/702 |
| 7,303,081 B2 * | 12/2007 | Mallett | ............... | B07C 7/005 209/583 |
| 7,311,207 B2 * | 12/2007 | Mallett | ............... | B07C 7/005 209/702 |

(56) References Cited

U.S. PATENT DOCUMENTS

| | | | |
|---|---|---|---|
| 7,318,529 B2 * | 1/2008 | Mallett | A61L 11/00 209/702 |
| 7,484,561 B2 * | 2/2009 | Bridges | E21B 43/2401 166/248 |
| 7,486,248 B2 * | 2/2009 | Halek | H01Q 1/04 210/748.07 |
| 7,534,926 B2 * | 5/2009 | Stegemeier | B09C 1/00 588/253 |
| 7,562,025 B2 * | 7/2009 | Mallett | B07C 7/005 705/308 |
| 7,660,724 B2 * | 2/2010 | Mallett | B07C 5/3412 705/1.1 |
| 7,703,513 B2 * | 4/2010 | Vinegar | C10G 1/02 166/245 |
| 7,942,203 B2 * | 5/2011 | Vinegar | E21B 36/02 166/252.1 |
| 8,132,987 B2 | 3/2012 | Gerhard et al. | |
| 8,195,328 B2 * | 6/2012 | Mallett | A61L 11/00 700/236 |
| 8,210,256 B2 * | 7/2012 | Bridges | E21B 36/04 166/248 |
| 8,267,170 B2 * | 9/2012 | Fowler | E21B 43/2401 166/245 |
| 8,726,986 B2 * | 5/2014 | Parsche | E21B 43/2401 166/248 |
| 9,033,042 B2 * | 5/2015 | Karanikas | E21B 36/001 166/302 |
| 9,168,409 B2 | 10/2015 | Thomas et al. | |
| 9,259,770 B2 | 2/2016 | Thomas et al. | |
| 2014/0241806 A1 | 8/2014 | Rockwell et al. | |

FOREIGN PATENT DOCUMENTS

| | | | |
|---|---|---|---|
| KR | 101267249 B1 * | 5/2013 | |
| WO | 2017035669 | 3/2017 | |

OTHER PUBLICATIONS

Chien, Yi-Chi; "Field Study of in Situ Remediation of Petroleum Hydrocarbon Contaminated Soil on Site Using Microwave Energy"; Journal of Hazardous Materials, (2012), vols. 199-200, pp. 457-461.

Falciglia, P.P., et al.; "An Overview on Microwave Heating Application for Hydrocarbon-Contaminated Soil and Groundwater Remediation"; Oil and Gas Research, (2016), vol. 2, Issue 1, pp. 1-6.

Falciglia, Pietro P., et al.; "Microwave Heating Remediation of Soils Contaminated with Diesel Fuel"; J. Soils Sediments, (2013), vol. 13, pp. 1396-1407.

Menedez, J.A., et al.; "Microwave Heating Processes Involving Carbon Materials"; final version published in Fuel Processing Technology, (2010), vol. 91, Issue 1, pp. 1-8.

Robinson, J., et al.; "Microwave Treatment of Oil Contaminated Drill Cuttings—Towards a Commercial Scale System"; SPE 127064, pp. 1-6.

* cited by examiner

SYSTEMS AND METHODS FOR THERMAL TREATMENT OF CONTAMINATED MATERIAL

FIELD

The present invention relates to a method and system for remediating contaminated material by thermal treatment. The invention further relates to methods of remediating material by smoldering combustion processes using microwave energy.

BACKGROUND

A commonly encountered problem is the need to remediate mixed wastes that have been contaminated with organic substances such as petroleum hydrocarbons, volatile organic compounds, chlorinated solvents and organo-surfactants. Mixed wastes can include soils, sludges, drill cuttings and/or sediments, also referred to herein collectively as "soils." Thermal technologies such as thermal desorption, smoldering, pyrolysis and incineration are proven to be effective for the treatment of mixed wastes impacted with organic substances.

Most conventional thermal treatment technologies require heating of the entire mass of waste to very high temperatures (e.g., 475° C. to 1200° C.) to enhance the volatilization, degradation and/or combustion of the organic contaminants. The energy needs and costs associated with such treatment methods can therefore be prohibitively high. The presence of moisture in these wastes can reduce thermal treatment efficiency and/or further increase power needs and treatment time. Many sites are in remote locations where it may not be possible to provide sufficient power to make thermal treatment technologies viable. Consequently, most remediation practitioners choose other methods for treating impacted soils or even delay remediation of soils.

There is an ongoing need for cost-effective and energy efficient methods of treating contaminated material. In addition, there is a need for a cost-effective method incorporating waste drying.

SUMMARY

In one aspect, a method is provided for treating porous media containing an undesired organic substance. The method includes subjecting a portion of a volume of a mixture containing the porous media and the undesired organic substance to microwave irradiation to heat the portion of the volume of the mixture to a combustion temperature of from 150° C. to 1200° C. to initiate smoldering combustion. A flow of an oxidizer gas is initiated through the portion of the volume of the mixture and controlled at a rate such that a self-sustaining smoldering combustion front is formed that moves through additional portions of the volume of the mixture. The flow of the oxidizer gas is continued until a target amount of the undesired organic substance in the volume of the mixture reaches a destructive temperature and is thereby destroyed.

In another aspect, a method for treating porous media containing an undesired organic substance includes subjecting the volume of the mixture to microwave irradiation to heat the volume of the mixture to a destructive temperature of from 150° C. to 1200° C. thereby destroying a target amount of the undesired organic substance in the volume of the mixture.

In yet another aspect, a system is provided for treating porous media containing undesired substances. The system includes a source of microwave absorber to add to a mixture containing the porous media and the undesired substance or to place in a layer adjacent the mixture containing the porous media and the undesired substance. A source of microwave energy is provided for irradiating the mixture and the microwave absorber to heat the mixture and the microwave absorber to a combustion temperature of from 150° C. to 1200° C. to initiate smoldering combustion in the mixture. The microwave absorber accelerates the heating of the mixture. The system includes at least one waveguide connected to the source of the microwave energy. Each of the waveguides has a plurality of apertures for directing microwaves into the mixture and the microwave absorber. A gas blower is provided for initiating a flow of an oxidizer gas through the heated mixture such that a self-sustaining smoldering combustion front is formed that moves through the mixture. At least one gas injection line is connected to the gas blower.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Microwave irradiation is a time- and energy-efficient alternative to current resistive heating systems used in conventional thermal treatment technologies. Microwave heating is known to effectively treat organic contaminants, including but not limited to petroleum hydrocarbons, volatile organic compounds, and individual compounds, e.g. hexachlorobenzene or tetrachloroethene. Methods and systems for the thermal treatment of porous media, also simply referred to herein as "soils," containing undesired organic substance(s), also referred to herein as "contaminants," using microwave irradiation will now be described. In embodiments, a mixture containing the porous media or soil and the undesired organic substance, or a portion of a volume of such mixture, is treated. The porous media can include native soil, sludge, drill cuttings, sediment, and/or industrial waste. In one embodiment, the volume of the mixture further comprises moisture.

Figure 1:
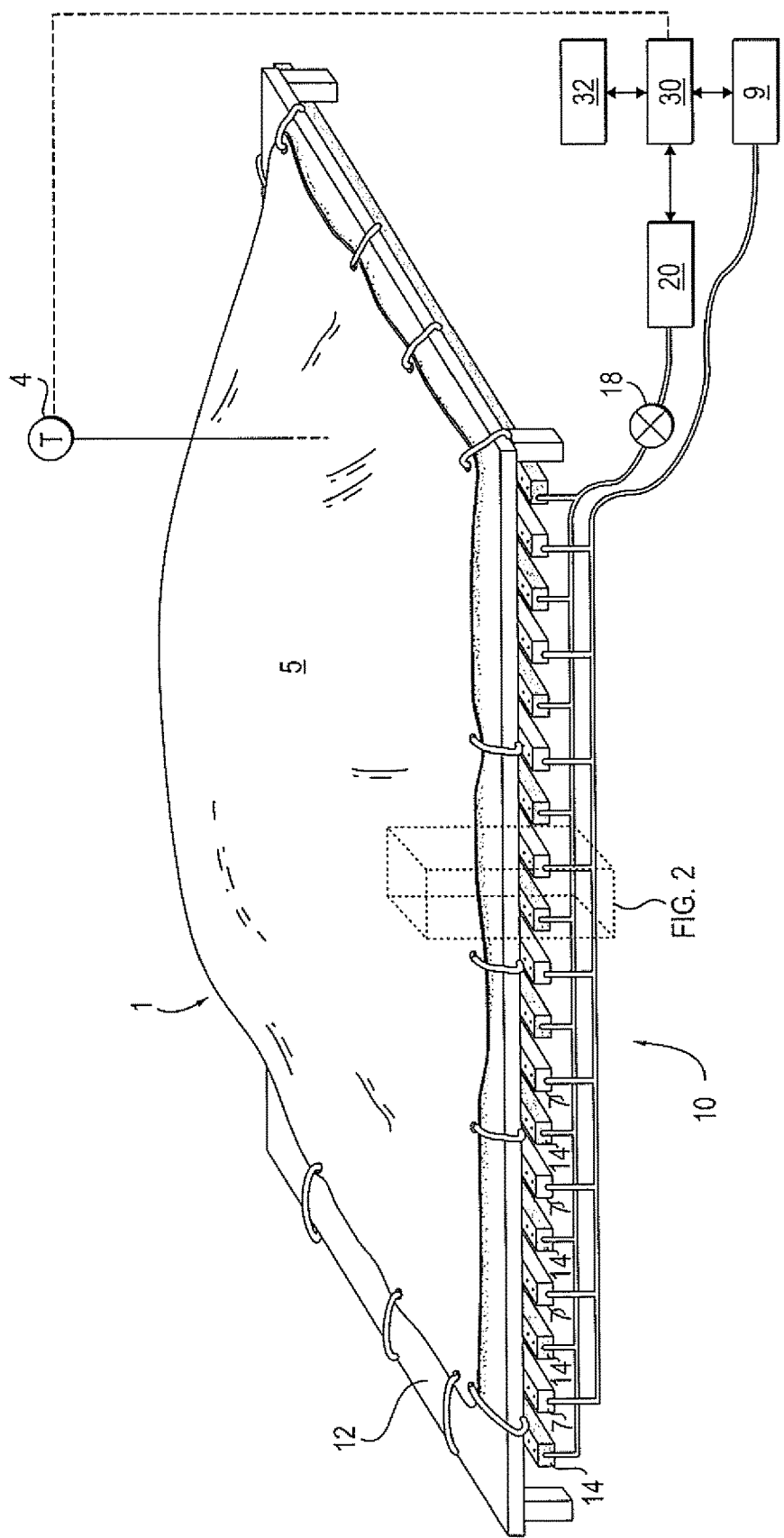
FIG. 1 is a simplified diagram illustrating a system in which a smoldering combustion process may be operated according to an exemplary embodiment.
Figure 2:
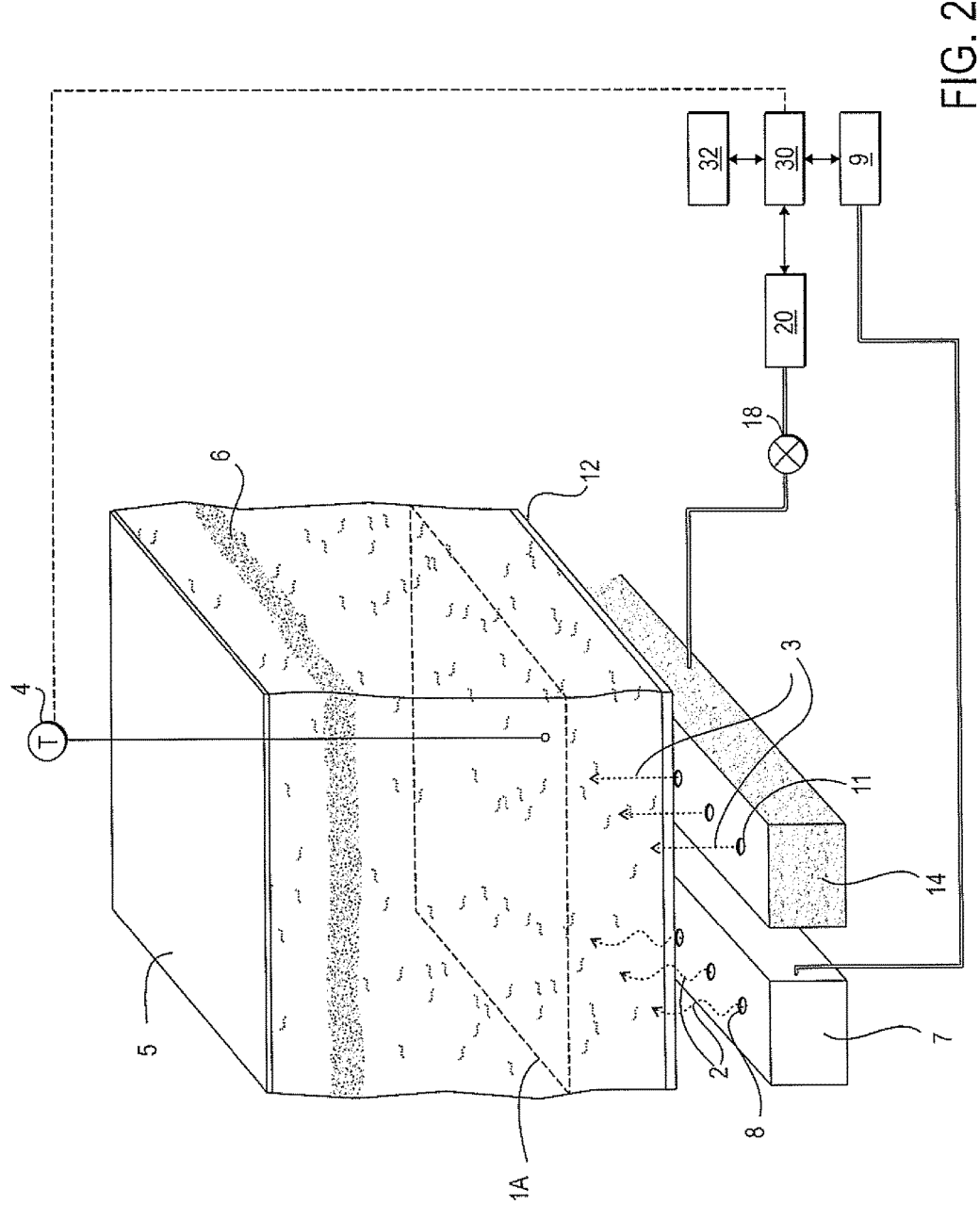
FIG. 2 is an expanded view of a called-out portion of FIG. 1.

Referring to FIGS. 1 and 2, in one embodiment, a volume 1 of a mixture containing the porous media or soil and the undesired organic substance, or a portion 1A of a volume 1 of such mixture, is subjected to microwave irradiation by microwaves 2 having a wave frequency of from 0.1 to 10 GHz.

In one embodiment, a volume 1 of a mixture containing the porous media or soil and the undesired organic substance is subjected to microwave irradiation 2 to heat the mixture to a destructive temperature. The "destructive temperature" is the temperature at which the undesired organic substance is destroyed. Therefore, a target amount of the undesired organic substance in the volume 1 of the mixture can be destroyed when the mixture is heated to the destructive temperature. In one embodiment, the undesired organic substance can include a halogen-containing hydrocarbon. In one embodiment, the undesired organic substance can include petroleum hydrocarbons, volatile organic compounds, hexachlorobenzene, tetrachloroethene and combinations thereof. In one embodiment, the destructive temperature is from 150° C. to 1200° C., even at least 120° C. The entire volume 1 of mixture containing the porous media and the undesired organic substance can be subjected to the microwave irradiation 2 simultaneously to heat the mixture to a destructive temperature, in a batch process.

In one embodiment, a portion 1A of the volume 1 of mixture containing the porous media and the undesired organic substance is subjected to microwave irradiation 2 to heat the portion 1A of the volume 1 of the mixture to a combustion temperature. The "combustion temperature" is the temperature at which smoldering combustion is initiated in the portion 1A of the volume 1 of the mixture. Smoldering occurs when a relatively small mass, such as a small amount of contaminated soil, is heated to ignition or combustion temperatures. In one embodiment, the combustion temperature is from 150° C. to 1200° C.

Once the smoldering combustion is initiated in the portion 1A of the volume 1 of the mixture, the microwave irradiation 2 can be terminated and a flow of an oxidizer gas 3, e.g. air, is initiated through the portion 1A of the volume 1 of the mixture. A gas blower 20, connected to at least one gas injection line 14, can be used for initiating the flow of the oxidizer gas through the heated mixture. As shown, the gas injection line 14 can take the form of a gas distribution manifold or network of piping having openings 11 through which the gas is introduced to the volume 1 of the mixture. The gas blower 20 may include a compression system to supply compressed gas to the distribution structure 14.

The gas flow is controlled at a rate such that a self-sustaining smoldering combustion front is formed that moves through additional, adjacent portions of the volume 1 of the mixture. Gas blowers 20 can be used to carry the heat from this combustion process as a heat front to ignite remaining mixture in the larger volume 1. In one embodiment, the oxidizer gas flow is controlled by the gas blower 20 and a valve 18. A control system 30 and a user interface 32 can be connected to the gas blower 20 for controlling the flow of the oxidizer gas. The oxidizer gas can be controlled to flow through the mixture at an average velocity of from 0.5 cm/sec to 7 cm/sec. If an additional gas is added to the air supply, there may be further storage vessels (not shown) to store the additional gas and controllable valves operable to mix the additional gas with the air supply.

The gas flow is continued until a target amount of the undesired organic substance in the volume 1 of the mixture reaches a destructive temperature, e.g., from 150° C. to 1200° C., and is thereby destroyed.

In one embodiment, the mixture (all or the portion of the volume 1) is subjected to microwave irradiation by exposing the mixture to microwaves 2 emitted from apertures in at least one waveguide 7 located below the volume of the mixture connected to a source of microwave energy 9. Suitable sources of microwave energy include commercial microwave generators, e.g., those available from Cober, Inc. (Stratford, Conn.) under the tradename CoberMuegge LLC, and from RF and Microwave Power Technology, LLC (Reno, Nev.). In one embodiment, the source of microwave energy 9 is connected to the control system 30 and the user interface 32 for controlling the operation of the microwave generator. The control system 30 may or may not be the same control system controlling the gas blower 20. The waveguide(s) 7 can have a plurality of apertures 8 for directing microwaves 2 into the mixture and the microwave absorber. In one embodiment, apertures 8 are in a top side of the waveguide(s) 7. The waveguide(s) 7 and the gas injection line(s) 14 are located below the mixture and the microwave absorber. In one embodiment, a support 12 can be located above the waveguide(s) 7 and the gas injection line(s) 14 for supporting the mixture and the microwave absorber and separating the mixture and the microwave absorber from the waveguide(s) 7 and the gas injection line(s) 14. The support 12 can be a grid, grate or any other permeable platform or frame through which the oxidizer gas can pass. In one embodiment, the support 12 takes the form of a conveyor belt so that the volume 1 of the mixture is caused to pass over the waveguide(s) 7 and the gas injection line(s) 14 in a continuous manner. In one embodiment, the waveguide(s) 7 has a protective covering (not shown) made from a material transparent to microwaves to cover and protect the apertures.

In one embodiment, the at least one waveguide 7 is positioned adjacent the gas injection line 14 below the mixture. In some embodiments, multiple waveguides 7 and gas injection lines 14 can be alternated in close proximity to each other so that all of the mixture is exposed to both microwave irradiation and oxidizer gas flow.

In some embodiments, a temperature sensor 4 is provided to monitor the temperature of the mixture during the smoldering combustion of the mixture. The temperature sensor 4 can be connected to the control system 30. A flexible tarp 5 and/or a layer of soil 5 can be used for covering the mixture during the smoldering combustion of the mixture.

As would be apparent to one of ordinary skill in the art, the control system 30 can be used to supervise the operation of the thermal treatment, typically including at least one computational device, which may be a microprocessor, a microcontroller, a programmable logical device or another suitable device. Instructions and data to control operation of the computational device may be stored in a memory which is in data communication with, or forms part of, the computational device. The instructions and data for controlling operation of the system may be stored on a computer readable medium from which they are loaded into the memory. Instructions and data may be conveyed to the control system 30 by means of a data signal in a transmission channel. Examples of such transmission channels include network connections, the internet or an intranet and wireless communication channels. The control system 30 is typically in data communication with a user interface 32 that allows users to enter information into the control system and includes displays to enable users to monitor the operation of the system. The control system is in data communication with the air distribution system 14, valve 18 and the air supply 20. Temperature sensors 4 may also be positioned in or around the volume of the combustible mixture 24 to monitor the state of the combustion process. Where such instrumentation is provided, the data generated by the instrumentation may be displayed locally near the instruments. The data may be provided to the control system 30 for display on the user interface 32 and storage in memory.

In one embodiment, a microwave absorber material is added to the mixture prior to subjecting the volume 1 of the mixture to microwave irradiation 2 to accelerate the heating of the volume 1 of the mixture. In one embodiment, the microwave absorber can be placed in a layer 6 adjacent the mixture. The microwave absorber is added in any amount sufficient to accelerate the heating of the mixture, i.e., heating the mixture to a combustion temperature at a rate greater than if the same amount of microwave energy were applied to the same amount of unamended mixture. In one embodiment, the microwave absorber is added to the mixture at a rate of from 0.1 to 10% of the mixture by weight. Adding the microwave absorber to the mixture can also increase the thermal energy distribution in a significantly shorter timeframe, such that the thermal energy is uniformly distributed in the volume 1 of the mixture. This results in more efficient and faster heating of a contaminated soil matrix, and therefore lower power necessary to achieve smoldering combustion of the mixture.

The microwave absorber can include organic material, such as carbon nanomaterials and/or coker coke. The microwave absorber can include inorganic material, e.g. magnetite, ferrite and/or iron carbonyl containing compounds. The microwave absorber can also include soil rich in clay, e.g. soil rich in smectite clay, montmorillonite clay, and/or illite clay. The microwave absorber can have a dielectric constant of greater than 5 and a loss tangent greater than 0.02.

In one embodiment, a solid or liquid oxygen source can be included in the mixture to release oxygen gas during the heating of the mixture, thus enhancing the self-sustaining smoldering combustion front.

Figure 3:
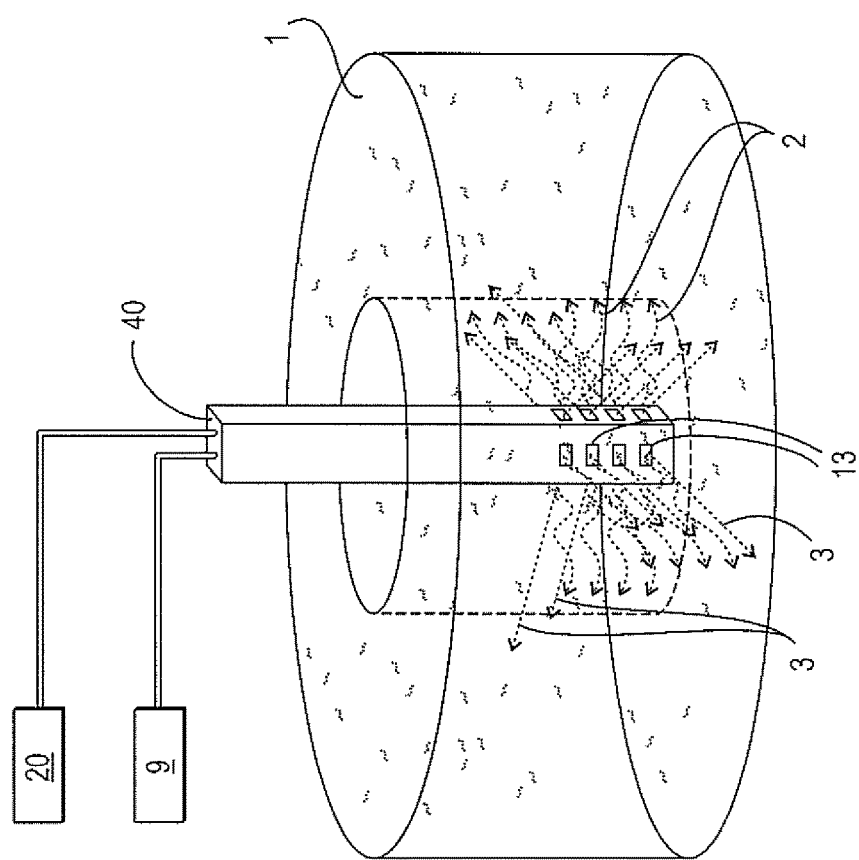
FIG. 3 is a simplified diagram illustrating a system in which a smoldering combustion process may be operated according to another exemplary embodiment.

Referring to FIG. 3, in one embodiment, the mixture (all or the portion of the volume 1) is subjected to microwave irradiation and the flow of the oxidizer gas by placing at least one dual function waveguide/gas injection line 40 into the mixture and connecting the dual function waveguide/gas injection line(s) 40 to a source of microwave energy 9 and to a gas blower 20. The dual function waveguide/gas injection line 40 serves as both the waveguide and the gas injection line. Each dual function waveguide/gas injection line 40 is connected to the source of the microwave energy 9 and the gas blower 20. The dual function waveguide/gas injection line(s) can be placed into the volume 1 of the mixture in a generally vertical position. In this case, apertures 13 can be located in a lower end of the waveguide 40. Gas 3 and microwaves 2 are introduced into the volume 1 through the apertures 13.

In one embodiment, after destroying the target amount of the undesired organic substance, the treated porous media is removed from the volume 1 and the removed amount of the treated porous media is monitored, e.g., weighed using a scale. The volume 1 of the mixture containing the porous media and the contaminants can then be replenished at a controlled rate dependent on the amount of the removed treated porous media to continue the smoldering combustion.

In one embodiment, off-gases vaporized from the mixture during the smoldering combustion are collected. A hose (not shown) can be used to recover vapor from the mixture during the smoldering combustion of the mixture. The off-gases can then be further processed to treat them.

EXAMPLES

Example 1

As a general preparation, 151.8 grams of a test soil sample was placed in an alumina cylindrical crucible test cell having a ID of 53.5 mm and a length of 52.8 mm with a lid (sold under the trade name Coors™). The test cell was placed inside an alumina fiber container in a 1400-watt microwave oven (commercially available from the Panasonic Corporation). The sample was heated for 1-40 minutes total. The samples were quickly pulled from the microwave oven in time intervals ranging from 1 minute to 7.5 minutes to measure the temperature in the center of the cell and on the edge of the cell. The samples were then returned to the microwave oven in less than 1 minute to continue with the microwave treatment. TPH analysis (total petroleum hydrocarbon) and dielectric measurements were run at the end of the microwave treatment using EPA method 8015.

The synthetic soil was a loam containing with about 5 wt % light, sweet crude oil. Some soil samples were blended with carbon nanofibers at from 0 to 0.1 wt % to evaluate the potential heating effects. Various soil samples were subjected to the experimental conditions specified in Table 1. The observed temperature increase inside the test cell ranged from 120 to 480° C. Table 1 lists the TPH results and the percent TPH reduction as compared with no microwave treatment.

TABLE 1

| Example No. | TPH Measured by GCFID (mg/ kg dry weight) | TPH reduction (%) as compared to no treatment |
|---|---|---|
| Comparative Example 1: Synthetic Soil with no treatment | 33679 | |
| Example 1: Synthetic Soil treated with 1 min microwave treatment | 23260 | 31% |
| Example 1: Synthetic Soil treated with 20 min microwave treatment | 2075 | 94% |
| Comparative Example 1: Synthetic Soil and 0.1% wt carbon nanofiber without microwave treatment | 31515 | 6% |
| Example 1: Synthetic Soil and 0.1% wt carbon nanofiber with 5 min microwave treatment | 20969 | 38% |

Examples 2 and 3

To further evaluate longer treatment time and maintain the temperature above 450° C., some field soil samples were tested following the same procedure as Example 1. Example 2 is a light crude oil, also referred to as "BM3" soil and Example 3 is a heavy crude oil, also referred to as "BM4" soil. Again, some soil samples were blended with carbon nanofiber at 0.1% wt. The testing time ranged from 0 to 45 mins. Table 2 lists the TPH results and the percent TPH reduction as compared with no microwave treatment. The measured temperature ranged from 169 to 804° C. inside the alumina cell.

TABLE 2

| Example No. | TPH Measured by GCFID (mg/ kg dry weight) | TPH reduction (%) as compared to no treatment |
|---|---|---|
| Comparative Example 2: BM3 soil without treatment | 22601 | |

TABLE 2-continued

| Example No. | TPH Measured by GCFID (mg/ kg dry weight) | TPH reduction (%) as compared to no treatment |
|---|---|---|
| Example 2: BM3 soil with 40 min microwave treatment | 17396 | 23% |
| Example 2: BM3 soil and 0.1% wt carbon nanofiber with 12 min microwave treatment | 8721 | 61% |
| Comparative Example 3: BM4 soil without treatment | 22628 | |
| Example 3: BM4 soil with 20 min microwave treatment | 72 | 100% |
| Example 3: BM4 soil and 0.1% wt carbon nanofiber with 6 min microwave treatment | 1661 | 93% |

All the soil samples blended with carbon nanofiber reached combustion or ignition temperature after 5-7 mins of microwave treatment at 2450 MHz, while the soils without carbon nanofibers needed over ten minutes exposure to microwave to reach the same combustion or ignition temperature. Significant TPH reduction was observed with longer treatment times. The TPH reduction ranged from 23 to 100% for all the tested soil samples. The different soil type affects the microwave energy absorption. In particular, clay content can decrease the heating efficiency. As seen from Table 3, the dielectric properties measured in pre- and post-treatment soil samples support the variable loss tangent observed in different soils tested.

TABLE 3

| Example No. | Average Dielectric Constant | Average Loss Tangent |
|---|---|---|
| Comparative Example 1: Synthetic Soil with no treatment | 6.2 | 0.43 |
| Example 1: Synthetic Soil treated with 1 min microwave treatment | 1.6 | 0.03 |
| Example 1: Synthetic Soil treated with 15 min microwave treatment | 6.3 | 0.27 |
| Example 1: Synthetic Soil + 0.1% wt carbon nanofiber with 5 min microwave treatment | 2.1 | 0.03 |
| Comparative Example 2: BM3 soil without treatment | 24.7 | 0.42 |
| Example 2: BM3 soil with 40 min microwave treatment | 2.2 | 0.02 |
| Example 2: BM3 soil and carbon nanofiber with 15 min microwave treatment | 5.4 | 0.56 |
| Comparative Example 3: BM4 soil without treatment | 34.4 | 0.42 |
| Example 3: BM4 soil with 20 min microwave treatment | 31.0 | 0.59 |
| Example 3: BM4 soil and 0.1% wt carbon nanofiber with 15 min microwave treatment | 6.0 | 0.21 |

Figure 4:
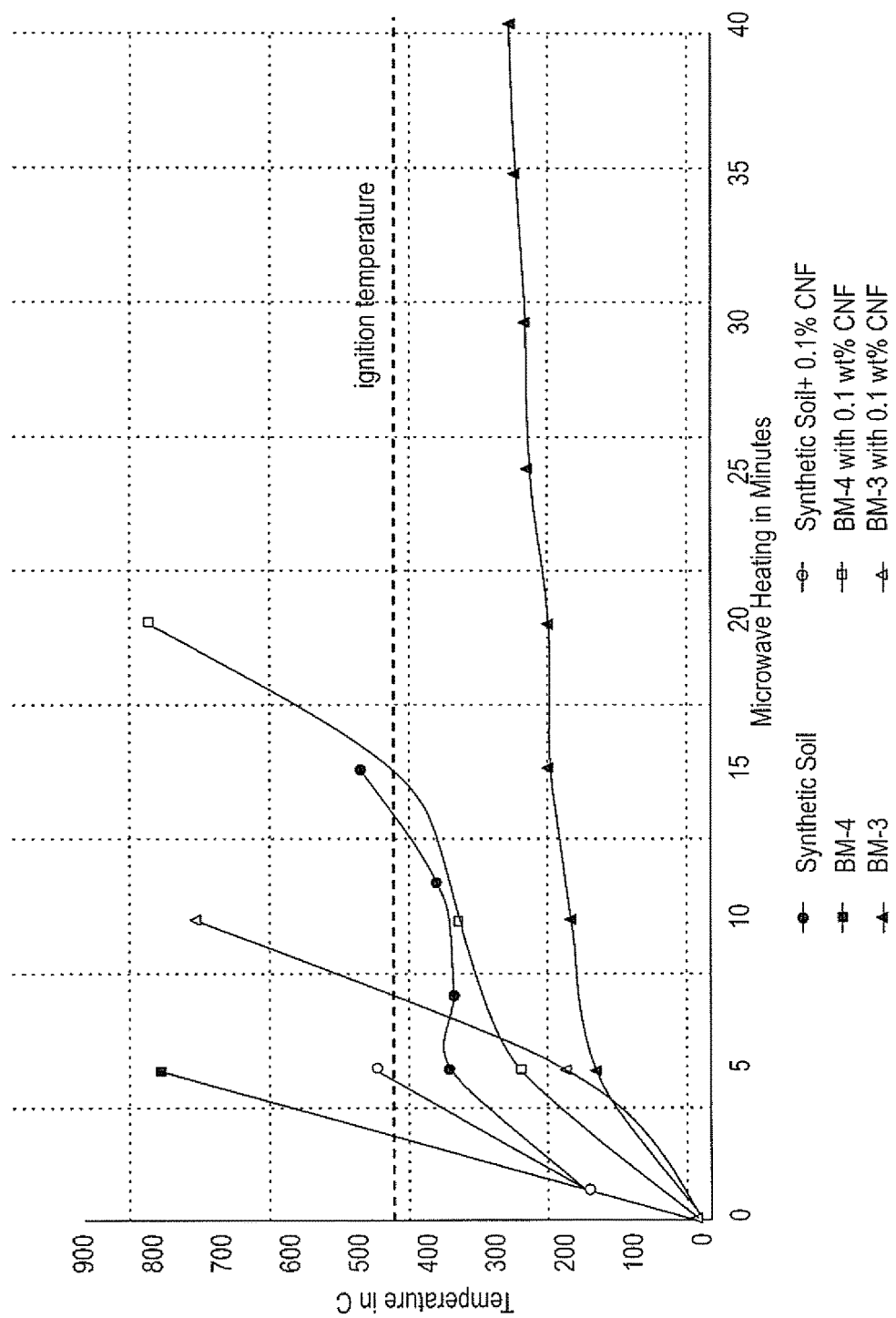
FIG. 4 is a plot of temperature of soil samples versus time of exposure to microwaves for three soil samples, with and without microwave absorber additives.

FIG. 4 is a plot of the temperature in the center of soil samples versus time of exposure to 2450 MHz microwaves. FIG. 4 includes data for synthetic soil samples with and without 0.1% carbon nanofiber (Example 1), BM3 samples with and without 0.1% carbon nanofiber (Example 2) and BM4 samples with and without 0.1% carbon nanofiber (Example 3). Open circles represent the soil samples containing 0.1 wt. % carbon nanofiber, which strongly absorbs microwaves, while the filled circles represent un-doped soil. As can be seen in FIG. 4, the BM3 soils achieved higher temperatures above smoldering temperature with the carbon nanofiber additive as compared to the un-doped soil. For the BM4 and synthetic soil, the heating time was much shorter in the presence of the carbon nanofiber additive.

Example 4 (Prophetic)

Referring to FIG. 3, a treatment system utilizes a microwave having a frequency of 2450, 915, 60 or 40 MHz to ignite and combust contaminated soil. For 2450 MHz, a rectangular waveguide 40 with inner dimensions of 3.40"× 1.70" can be used. The 2450 MHz microwave rectangular waveguide is fit into a 9⅝" outer diameter (6¼" inner diameter) hollow stem auger (not shown). Soil amendments (e.g., carbon or coke absorbents) can be optionally added. Air 3 is blown into the waveguide 40 to assist with combustion. The waveguide 40 has apertures or slits 13 cut in the bottom and covered with a porous ceramic (not shown) so that air 3 can blow through. For 915 MHz, the rectangular waveguide 40 has inner dimensions of 9.75"×4.875". A 915 MHz rectangular waveguide 40 is fit into a 12¼" inner diameter, 17" outer diameter hollow stem auger (not shown).

Example 5 (Prophetic)

Referring to FIG. 1, shown is one exemplary design of a treatment system 10 that can be used when only 2" of soil needs to be heated to 270° C. to start combustion. A 16 foot×50 foot stainless steel plate 12 is built from 14 3.6"× 1.9" outer diameter (2450 MHz) waveguides 7 with a series of slits cut in the top. Each waveguide 7 is powered from a single 10 kW magnetron 9. If the soil contains about 20% moisture, it will take about 105 kWh of heat to warm the soil from 25° C. to 270° C. A microwave-powered thin layer soil treatment system with only electricity will use less electrical energy than an electrically resistive heated thin layer soil treatment system, since microwaves 2 are only heating the soil above a waveguide 7 and not the waveguide 7 or the soil below the waveguide 7. The microwave system should take about 1 hour to heat the bottom 2" of soil to a combustion temperature of greater than 270° C. Thus, the economic advantages of microwave heating are faster throughput and less energy consumption as compared with an electrically resistive soil treatment system.

It should be noted that only the components relevant to the disclosure are shown in the figures, and that many other components normally part of a smoldering combustion soil treatment system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A method for treating porous media containing an undesired organic substance, comprising:
   a. providing a volume containing the porous media and the undesired organic substance;
   b. adding a microwave absorber to the volume to thereby form a volume of a mixture to accelerate microwave heating of the volume of the mixture;
   c. subjecting a portion of the volume of the mixture to microwave irradiation to heat the portion of the volume of the mixture to a combustion temperature of from 150° C. to 1200° C.;
   d. initiating smoldering combustion in the portion of the volume of the mixture;
   e. terminating the microwave irradiation once the smoldering combustion in the portion of the volume of the mixture is initiated;
   f. initiating a flow of an oxidizer gas through the portion of the volume of the mixture once the smoldering combustion in the portion of the volume of the mixture is initiated and controlling the flow at a rate such that a self-sustaining smoldering combustion front is formed that moves through remaining additional portions of the volume of the mixture; and
   g. continuing the flow of the oxidizer gas until a target amount of the undesired organic substance in the volume of the mixture reaches a destructive temperature and is thereby destroyed.

2. The method of claim 1 wherein the portion of the volume of the mixture is subjected to microwave irradiation and the flow of the oxidizer gas by placing at least one dual function waveguide/gas injection line into the volume of the mixture and connecting the at least one dual function waveguide/gas injection line to a source of microwave energy and to a gas blower.

3. The method of claim 1 wherein the destructive temperature is at least 150° C.

4. The method of claim 1 wherein the undesired organic substance comprises a halogen-containing hydrocarbon.

5. The method of claim 1 wherein the undesired organic substance is selected from the group consisting of petroleum hydrocarbons, volatile organic compounds, hexachlorobenzene, tetrachloroethene and combinations thereof.

6. The method of claim 1 wherein the porous media comprises native soil, sludge, drill cuttings, sediment, and/or industrial waste.

7. The method of claim 1 wherein the microwave absorber comprises organic material, inorganic material, and/or soil rich in clay.

8. The method of claim 1 wherein the microwave absorber organic material comprises carbon nanomaterials and/or coker coke.

9. The method of claim 1 wherein the inorganic material comprises magnetite, ferrite and/or iron carbonyl containing compound.

10. The method of claim 1 wherein the microwave absorber is added to the mixture at a rate of from 0.1 to 10% of the mixture by weight.

11. The method of claim 1 wherein the microwave absorber has a dielectric constant of greater than 5 and a loss tangent greater than 0.02.

12. The method of claim 1 wherein the oxidizer gas flow is controlled by a gas blower and the oxidizer gas flows through the mixture at an average velocity of from 0.5 cm/sec to 7 cm/sec.

13. The method of claim 1 wherein the oxidizer gas comprises air.

14. The method of claim 1 wherein the volume of the mixture is subjected to microwave irradiation in step (b) by exposing the volume of the mixture to microwaves having a wave frequency of from 0.1 to 10 GHz.

15. The method of claim 1 wherein the volume of the mixture is subjected to microwave irradiation in step (b) by exposing the volume of the mixture to microwaves emitted from apertures in at least one waveguide connected to a source of microwave energy wherein the at least one waveguide is located below the volume of the mixture.

16. The method of claim 1 wherein the microwave irradiation is terminated 5 minutes to 1 hour after the microwave irradiation of step (c) is begun.

17. The method of claim 1 wherein the microwave absorber comprises carbon nanofiber added to the mixture at a rate of 0.1% of the mixture by weight.

18. The method of claim 1 wherein the portion of the volume of the mixture comprises at least 2 inches in height of the volume of the mixture.

19. A system for treating porous media containing an undesired organic substance, comprising:
   a. a source of microwave absorber to add to a volume containing the porous media and the undesired organic substance to thereby form a volume of a mixture to accelerate microwave heating of the volume of the mixture;
   b. a source of microwave energy capable of generating microwaves having a wave frequency of from 0.1 to 10 GHz for irradiating a portion of the volume of the mixture to heat the mixture to a combustion temperature of from 150° C. to 1200° C. to initiate smoldering combustion in the mixture;
   c. at least one waveguide connected to the source of the microwave energy, wherein each of the waveguides has a plurality of apertures for directing microwaves into the portion of the volume of the mixture;
   d. a gas blower for providing a flow of an oxidizer gas through the portion of the volume of the mixture;
   e. at least one gas injection line connected to the gas blower;
   f. a temperature sensor for monitoring a temperature of the portion of the volume of the mixture; and
   g. a control system connected to the temperature sensor and in communication with the gas blower for initiating the flow of the oxidizer gas through the portion of the volume of the mixture once the smoldering combustion in the portion of the volume of the mixture is initiated and for controlling the flow at a rate such that a self-sustaining smoldering combustion front is formed that moves through remaining additional portions of the volume of the mixture.

20. The system of claim 19 wherein the microwave absorber comprises carbon nanofiber.

21. The system of claim 19 wherein the at least one waveguide is located below the mixture and the microwave absorber, the plurality of apertures is located in a top side of the at least one waveguide, and the at least one gas injection line is located below the mixture and the microwave absorber, and further comprising a grate located above the at least one waveguide and the at least one gas injection line for supporting the mixture and the microwave absorber.

22. The system of claim 19 further comprising a solid or liquid oxygen source to be included in the mixture that releases oxygen gas during the heating of the mixture.

23. The system of claim 19 further comprising a flexible tarp flexible tarp and/or a layer of soil for covering the mixture during the smoldering combustion of the mixture.

24. The system of claim 19 wherein the at least one waveguide and the at least one gas injection line are at least one dual function waveguide/gas injection line wherein each dual function waveguide/gas injection line is connected to the source of the microwave energy and the gas blower.

25. The system of claim 24 wherein the at least one dual function waveguide/gas injection line is positioned in the mixture and the microwave absorber in a generally vertical position; and the plurality of apertures are positioned in a lower end of the at least one waveguide.

\* \* \* \* \*